United States Patent [19]

Virani et al.

[11] 4,034,266

[45] July 5, 1977

[54] ELECTRIC WALL RECEPTACLE WITH GROUND FAULT PROTECTION

[75] Inventors: Gopal J. Virani, Bridgeport; John J. Misencik, Shelton, both of Conn.

[73] Assignee: Westinghouse Electric Corporation, Pittsburgh, Pa.

[22] Filed: Aug. 29, 1975

[21] Appl. No.: 609,135

[52] U.S. Cl. .................................... 361/42; 335/18; 335/21; 361/356

[51] Int. Cl.$^2$ .......................................... H02H 3/28

[58] Field of Search .............. 317/18 D, 18 A, 112, 317/119, 120; 335/18 R, 21

[56] References Cited

UNITED STATES PATENTS

| | | | |
|---|---|---|---|
| 3,725,741 | 4/1973 | Misencik | 317/18 D |
| 3,761,774 | 9/1973 | Laughinghouse et al. | 317/18 D X |
| 3,864,649 | 2/1975 | Doyle | 335/18 X |
| 3,898,528 | 8/1975 | Runtsch et al. | 317/18 D |
| 3,922,586 | 11/1975 | Buxton et al. | 335/18 X |
| 3,931,601 | 1/1976 | Anderson | 317/18 D X |

*Primary Examiner*—J D Miller
*Assistant Examiner*—Patrick R. Salce
*Attorney, Agent, or Firm*—L. P. Johns

[57] ABSTRACT

An electric receptacle with ground fault protection characterized by an insulating housing of rectangular configuration adapted for mounting in a wall outlet box. The housing comprises opposite end and edge walls with front and rear sides open and with a transverse partition dividing a chamber formed by the ends and side walls into a pair of side-by-side compartments. Partition aperture means between the compartments and the first compartment communicating with the open front side and the second compartment communicating with the open rear side. At least one portion of the partition being nearer the front side than the remaining portions. Receptacle components are disposed in the first compartment and electronic components are disposed in the second compartment, and the components in each compartment are so disposed as to minimize the space requirements for the receptacle.

6 Claims, 10 Drawing Figures

ELECTRIC WALL RECEPTACLE WITH GROUND FAULT PROTECTION

BACKGROUND OF THE INVENTION

1. Field of the Invention

This invention relates to an electric receptacle for a wall outlet box.

2. Description of the Prior Art

The prior art of ground fault interrupter receptacles is limited at present, because they are in the development stage. A difficulty with such receptacles heretofore has been that receptacles with ground fault protection have been too large to mount in a conventional wall outlet box without the use of a fixture or extension block. One reason for the large size is that the receptacle with ground fault monitors contains electronic components, such as relays and solenoids. But a need exists for a receptacle with ground fault protection and having a compact size to enable insertion into a standard wall outlet box and which provides satisfactory electrical performance exists. One type of electric receptacle assembly with ground fault protection is that shown in U.S. Pat. No. 3,813,579.

Most receptacles with ground fault protection have involved various problems. First, the standard wall outlet box has been used with receptacles without ground fault protection. A receptacle having ground fault protection means involves additional parts that must be assembled in the same space as the original receptacle. There is also a problem of nuisance tripping incurred by the magnetic flux developed by the power source conductors which necessarily pass through the sensor coil of the ground fault detector. More particularly, the segments of the conductor are proximate to the coil due to the requirements of compactness of the assembly. As a result the magnetic flux in each conductor causes the coil to respond to current imbalances not incurred by real ground fault causes. In addition, other segments of the conductors on the opposite side of the sensor coil are connected to a contact carrier switch arm which must be free to move in response to ground fault causes and uninhibited by any mechanical force due to the wire.

Associated with the foregoing has been a need for a trip-free construction by which the receptacle cannot be reset so long as a ground fault continues to exist. It is desirable to provide the trip-free feature even though a reset button is held manually in place.

SUMMARY OF THE INVENTION

In accordance with this invention it has been found that the foregoing problems may be overcome by the provision of a compact electric receptacle adapted for mounting in a standard wall outlet box, comprising an insulating housing smaller than a standard wall outlet box and having opposite edge walls and opposite end walls forming open front and rear sides, a partition within the housing and dividing the housing into side-by-side first and second compartments, the first compartment communicating with the open front side and the second compartment communicating with the open rear side, the partition having aperture means between the compartments, the partition having at least one portion nearer the open front side than the remaining portions thereof, receptacle components in the first compartment and electronic components in the second compartment; the receptacle components comprising socket means for receiving the plug of an electric appliance, contacts movable between open and closed positions for interruptably connecting the socket means to a power source, a contact arm carrying one of the contacts, a latch member releasably engaging the contact arm, operating means for moving the contacts to their open position in response to a ground fault; the electronic components comprising ground fault responsive means for monitoring the flow of current in the conductors and delivering a fault signal to the operating means in response to a current imbalance in the conductors, and said responsive means comprising a toroidal coil through which the conductors extend.

DESCRIPTION OF THE PREFERRED EMBODIMENTS

Figure 10:
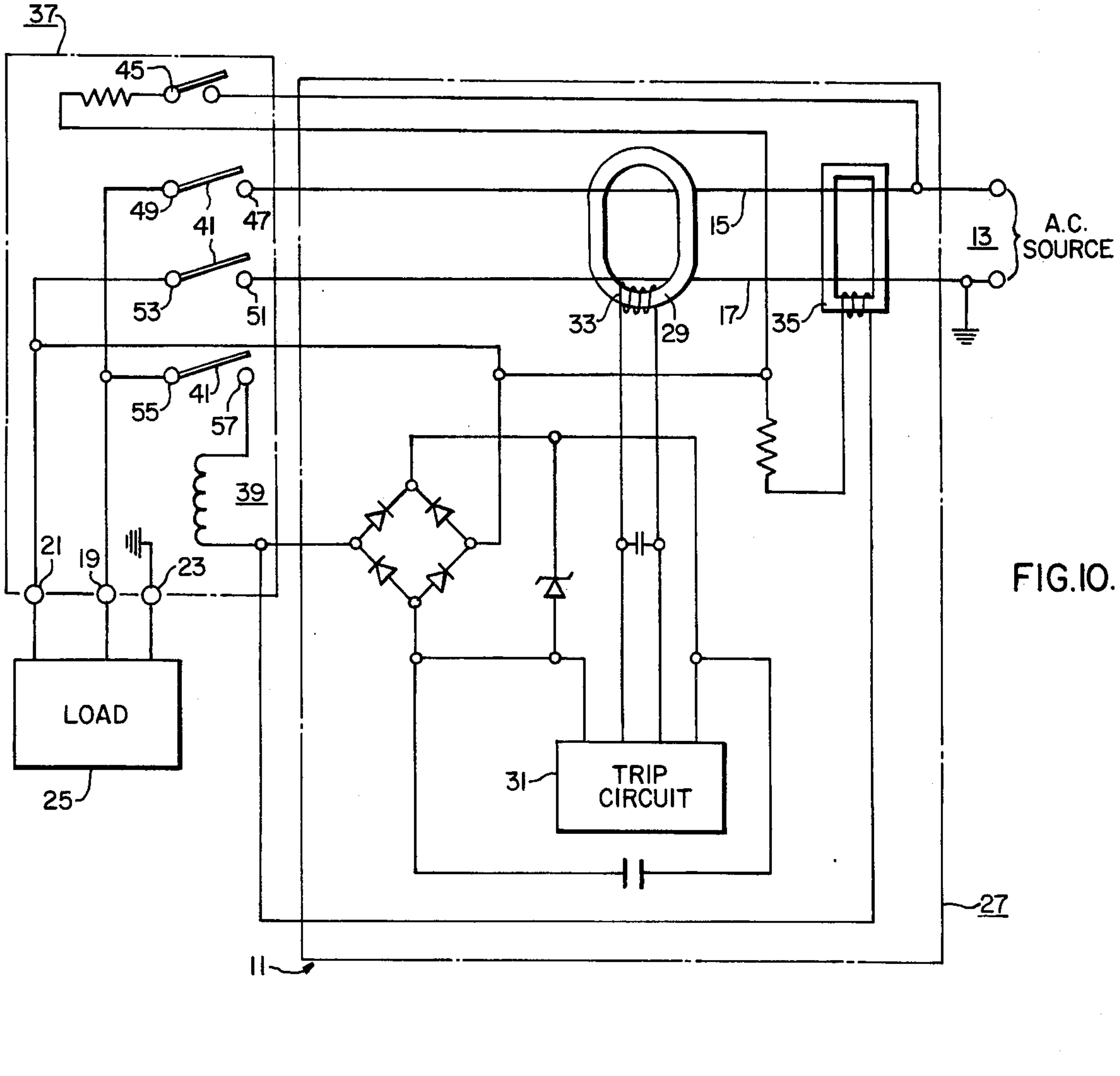
FIG. 10 is a wiring diagram of the receptacle assembly.

The electric receptacle with ground fault protection of this invention is generally indicated at 11 in FIG. 10. It is connected by a single phase, two-wire line to an AC power source 13, the two-wire line consisting of a line conductor 15 and a grounded neutral conductor 17. Although a single phase, two-wire system is disclosed, it is understood that conventional single phase or polyphase circuits consisting of three or four wires may be used.

The conductors 15, 17 extend through the receptacle 11 to socket means which include a line terminal 19, a neutral terminal 21, and a ground terminal 23, to which a load, such as an electrical appliance, is detachably connected in a conventional manner. The receptacle 11 comprises ground fault detection means included within a broken line rectangle generally indicated at 27 and comprising a differential transformer including a toroidal core 29 and a ground fault sensor for trip circuit 31. As disclosed in the prior art, such as U.S. Pat. No. 3,813,579, the line and neutral conductors 15, 17 pass through the toroidal core 29, thereby essentially comprising single turn primary windings of the core. A secondary winding 33 consists of a plurality of turns around the core and comprises a part of the trip circuit 31. The conductors 15, 17 also pass through a grounded neutral transformer 35 which is responsive to a fault on the load side of the differential transformer or core 29. The purpose and construction of the transformer 35 is set forth more particularly in the application of John J. Misencik, Ser. No. 417,659, filed Nov. 20, 1973; now U.S. Pat. No. 3,930,187. Operating means 39 comprise a solenoid by which the contact arm is actuated from the closed to the open position thereby opening circuits between pairs of contacts 47, 49, contacts 51, 53, and contacts 55, 57. The electronic portions of the receptacle 11 are contained within the broken line rectangle 27 as will be set forth more particularly below.

The electromechanical components of the receptacle 11 are contained within the broken line rectangle 37 and comprise an insulative contact arm 41, a reset mechanism 43, and a test button 45.

Figure 3:
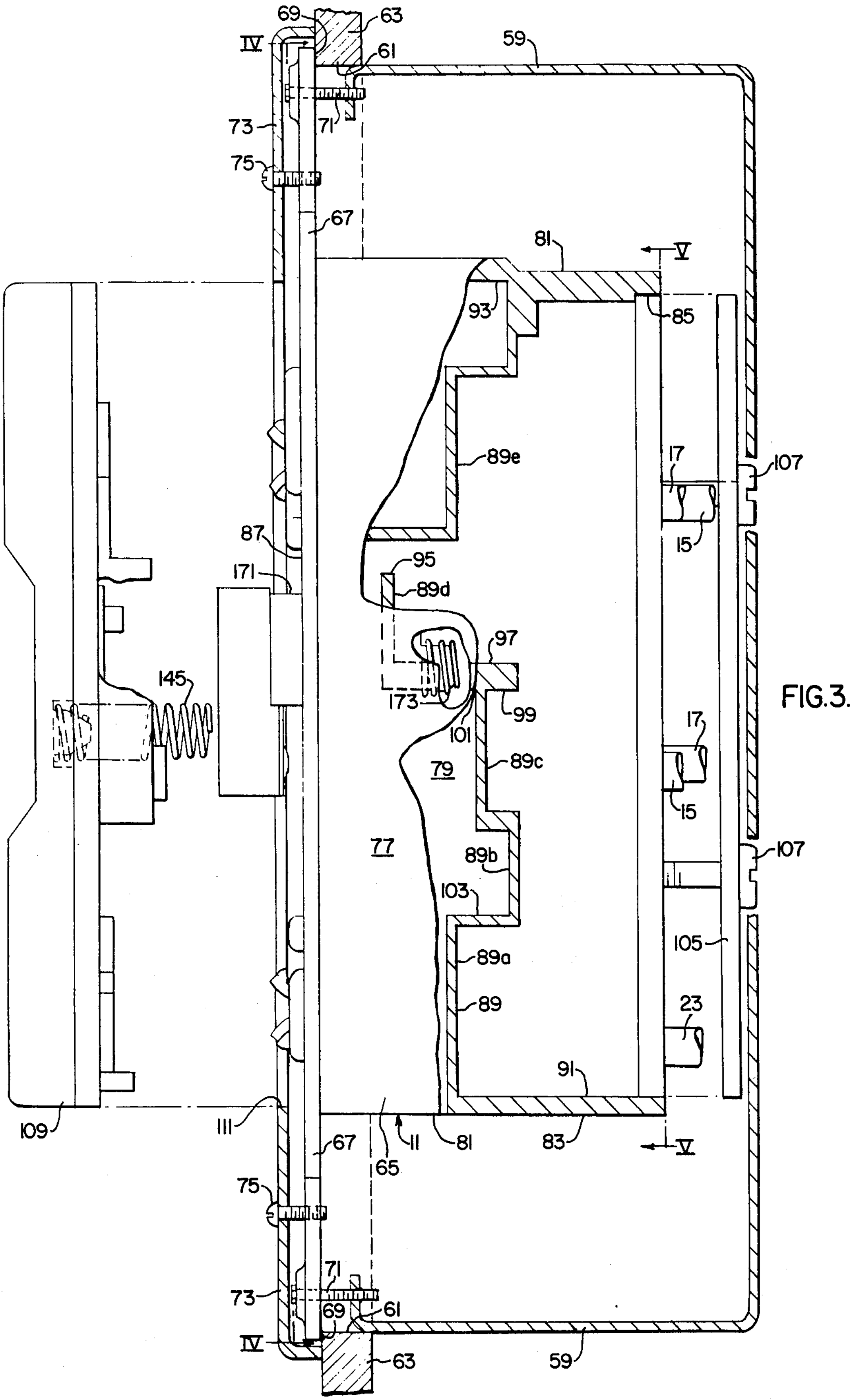
FIG. 3 is a vertical sectional view taken on the line III—III of FIG. 1 with some parts in exploded view and showing in addition the wall plate and wall outlet box in which the electric receptacle is disposed.

As shown in FIG. 3 the receptacle 11 is located within an outlet box 59 which is mounted within an opening 61 of a wall 63. The several components of the receptacle 11 are contained within an insulative housing 65 which is contained within the box 59 on a mounting plate 67 which is secured in place at peripheral areas in contact with the wall 63 at 69 by mounting screws 71 extending between the plate and the outlet box 59. A cover plate 73 is mounted over the mounting plate 67 and is secured in place by screws 75.

The insulative housing 65 is a rectangular member having opposite edge walls 77, 79, opposite end walls 81, 83, and opposite front and rear side openings 85, 87. A partition 89 extends across the interior of the housing 65 between opposite wall 77, 79, 81, 83, to divide the interior of the housing into the separate compartments 91, 93 corresponding respectively to the broken line rectangles 37, 27 as shown in FIG. 10. Spaced aperture means, such as an opening 95, are provided between opposite sides of the compartments 91, 93 to enable passage of wires such as the line and neutral conductors 15, 17. As shown in FIG. 3, the partition 89 includes spaced longitudinal portions **89*a*, 89*b*, 89*c*, 89*d*, 89*e* which are disposed at various lateral positions between the front and rear side openings 85, 87. The partition 89 provides various recesses such as recesses 97 and 99, on the side of the compartment 91, and recesses 101, 103 on the side of the compartment 93. By providing the partition 89 with partition segments 89*a–e* of different depths, the varous recesses, such as recesses 97–103 having different locations with respect to the front rear side openings 85, 87, enable the assembly of the several parts comprising the electronic and mechanical components into a more compact arrangement than would be possible if the partition 89 were a single planar member extending across the interior of the housing between the opposite end walls 81, 83**.

Moreover, the several recesses 97–103 enable the location of the several electronic and mechanical components in place with a minimum of mounting parts. The recesses hold several parts in place and prevent their shifting from position once they are seated in their predesigned locations. Accordingly, the partition performs the two-fold purpose of separating the electronic and mechanical portions from each other to prevent debris from the mechanical side, such as fumes resulting from arcing during opening and closing of the contacts, from contaminating the electronic side; and of conserving space in order to minimize the overall size of the housing 65 while providing an outlet receptacle with ground fault protection. In addition, the housing 65 includes a back cover 105 which is secured in place by spaced screws 107. The electronic or ground fault components 29, 31, 35 are contained within the second compartment between the partition 89 and the back cover 105. The so-called mechanical components 39, 41, 43, 45, 47–57, are contained within the compartment 91 between the partition 89 and the mounting plate 67.

Figure 2:
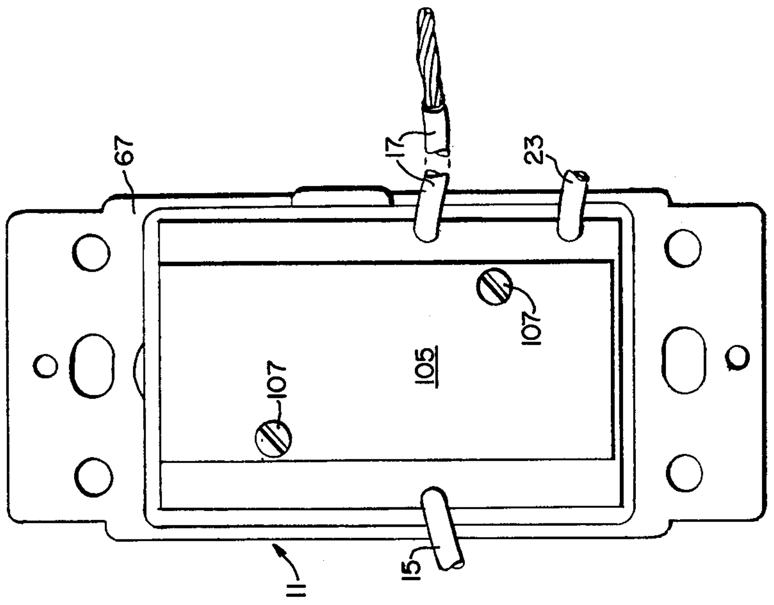
FIG. 2 is an elevational view of the rear side thereof.
Figure 1:
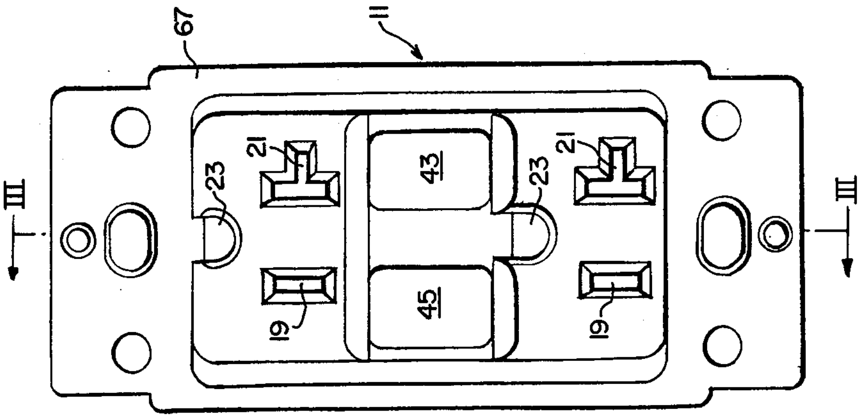
FIG. 1 is an elevational view of the front side of an electric receptacle in accordance with this invention.

In FIGS. 1 and 2 the front and rear sides of the receptacle 11 are shown in the assembled condition. The receptacle 11 is of the duplex type with one terminal above and another terminal below the reset and test buttons 43, 45. The reset and test buttons 43, 45 as well as the upper and lower receptacles or sockets 19, 21, 23 are disposed generally in the planar surface of the front side of the receptacle. As shown in FIG. 3, a front cover insert 109, shown in exploded position with respect to the receptacle 11, is disposed within an opening 111 in the cover plate 73 and is provided with aligned openings each group for the terminals 19, 21, 23, as well as the reset and test buttons 43, 45.

Figure 5:
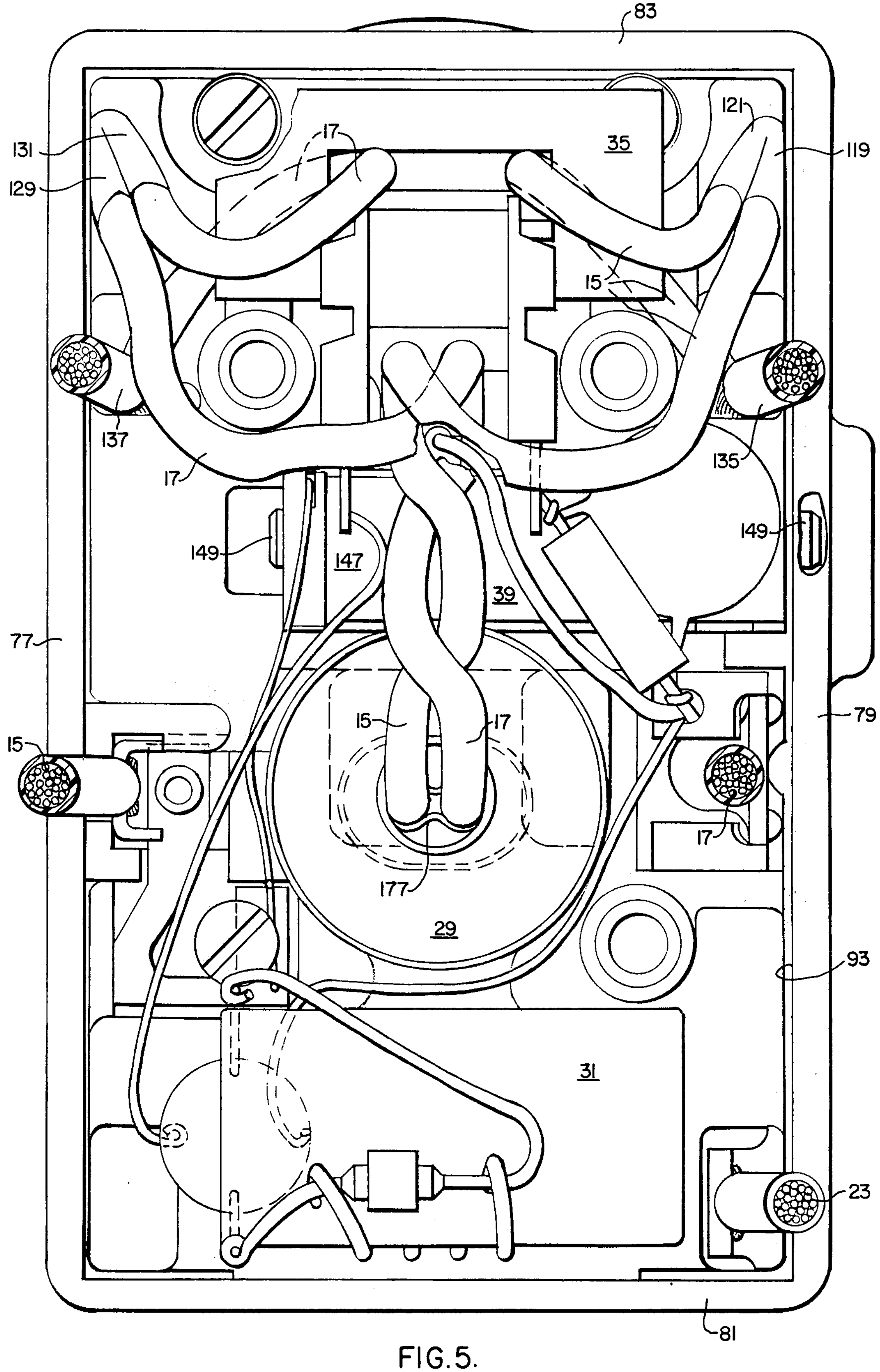
FIG. 5 is a vertical sectional view taken on the line V—V of FIG. 3.

As shown in FIG. 5 the electronic components comprising the ground fault protection portion of the receptacle 11 are contained within the compartment 93 between the partition 89 and the back cover 105. Those components comprise the toroidal core 29, the trip circuit 31, the operating means 39, and the grounded neutral transformer 35. Inasmuch as the detail description of these parts is set forth in U.S. Pat. Nos. 3,813,579, and application Ser. No. 417,659, filed Nov. 20, 1973, now U.S. Pat. No. 3,930,187, the description is limited to the parts that are essential to the operation of the invention disclosed herein.

Figure 4:
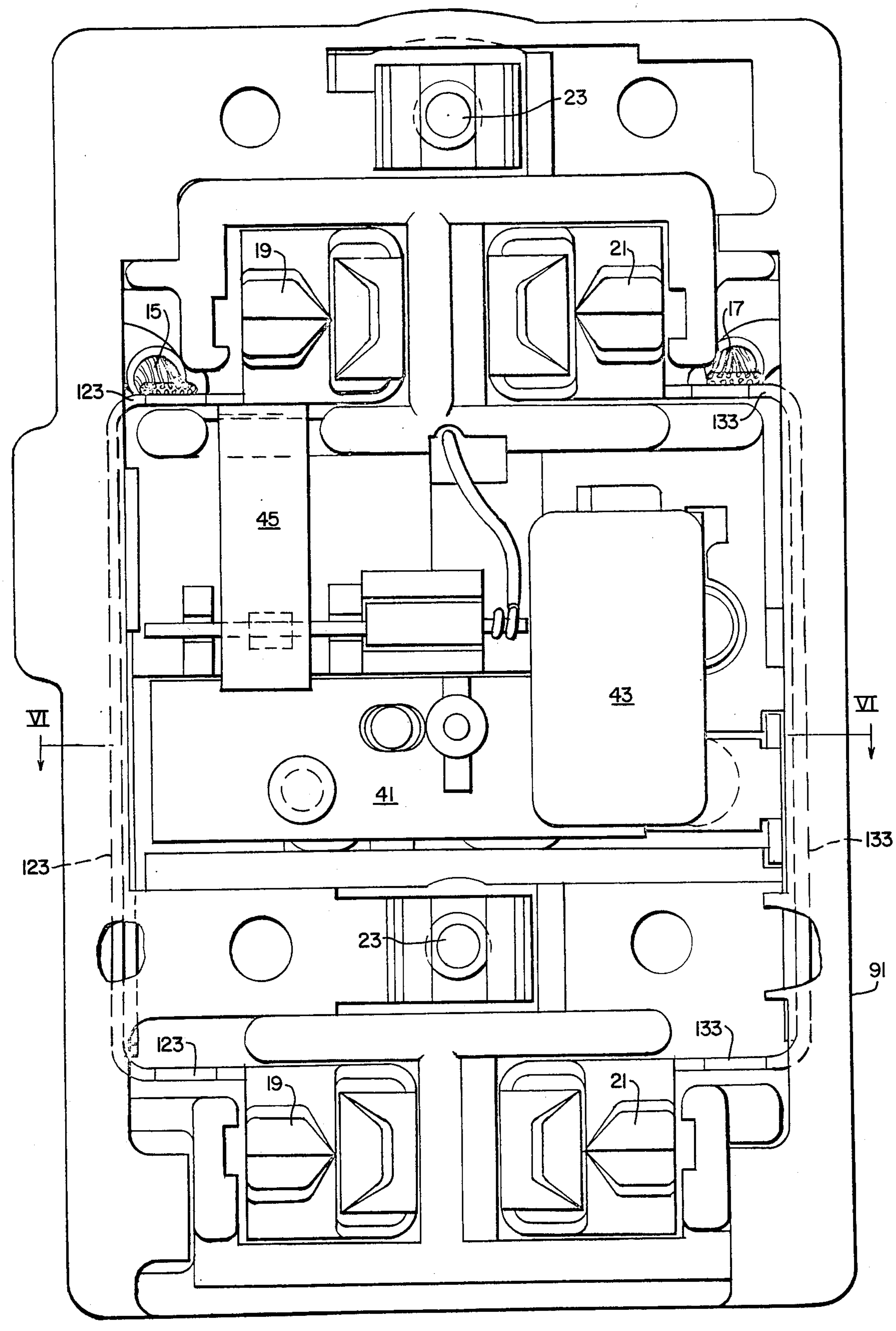
FIG. 4 is a vertical sectional view taken on the line IV—IV of FIG. 3.

The lead conductor 15 (FIG. 2) extends through the back cover 105 into the compartment 93 (FIG. 6) where it is connected to a contact bracket 113 which carries the current through an aperture in the partition 89 to contacts 47, 49 in the compartment 91. From there the current moves through a contact plate 115 which is secured to the contact arm 41. The circuit continues through a shunt which is a continuation of the conducter 15 that passes through an aperture 117 in the partition 89, and through the core 29. As shown in FIG. 5, the line conductor 15 extends from the core 29 to a splice 119 having a splice insulator 121 and then through the grounded neutral transformer 36 to a receptacle conductor 123 (FIG. 4) to which the conductor 15 is electrically secured such as by a spot weld (not shown). The receptacle conductor 123 extends between and is an integral part of the pair of line terminals 19 (upper and lower), whereby a circuit is maintained to both terminals.

In a similar manner a circuit through the neutral conductor 17 extends through the back cover 105 (FIG. 2) into the compartment 93 (FIG. 5) where the conductor is secured, such as by a weld, to a contact bracket 125 which extends through an aperture in the partition 89 to the compartment 91 (FIG. 6) where the circuit passes through the closed contacts 53, 51. The movable contact 51 is mounted on a contact plate 127 on the contact arm 41. From there the circuit passes through a shunt which is part of the neutral conductor 17 which extends through the aperture 117 and then through the core 29 into the compartment 93. The conductor 17 includes a splice 129 (FIG. 4) having a splice insulator and continues through the grounded neutral transformer 35 to a receptacle conductor 133 to which it is secured electrically, such as by a spot weld (not shown). Like the receptacle conductor 123, the conductor 133 is an integral part of both the upper and lower neutral terminals 21 between which it extends to provide a circuit through the lower terminal 21.

In the event that it is necessary to connect other receptacles having no ground fault protection units in the same circuit with the receptacle 11, a line conductor 135 (FIG. 5) and a neutral conductor 137 may be added by connecting said conductors at the junction of the line and neutral conductors 15, 17 to the receptacle conductors 123, 133, respectively, whereby feed through to the other receptacles is obtained.

In accordance with this invention as shown in FIG. 5 the line and neutral conductors 15, 17 are twisted around each other for at least one complete cycle coaxially of each other at the portion of the conductors adjacent the toroidal core 29 in order to eliminate nuisance tripping caused by surge currents in the conductors. The twisted conductors having magnetic fluxes have a cancelling effect upon each other and therefore do not influence the coil of the core 29.

In the closed circuit position of the contact arm 41 (FIG. 6) a latch plate 139 retains the arm in said position. For that purpose the latch plate 139 comprises a shoulder 141 which engages an edge 143 of the contact plate 115, thereby holding the arm 41 in said position against the pressure of a coil spring 145 so that circuits through the line conductor contacts 47, 49 as well as through the neutral conductor contacts 51, 43 are closed. Under predetermined conditions of overload current the operating means 39 which includes a solenoid 147 having a plunger 149, is actuated against the latch plate 139 to move the plate to the position shown in FIG. 8 so that the coil spring 145 moves the contact arm 41 to the open position of the contact.

Figure 6:
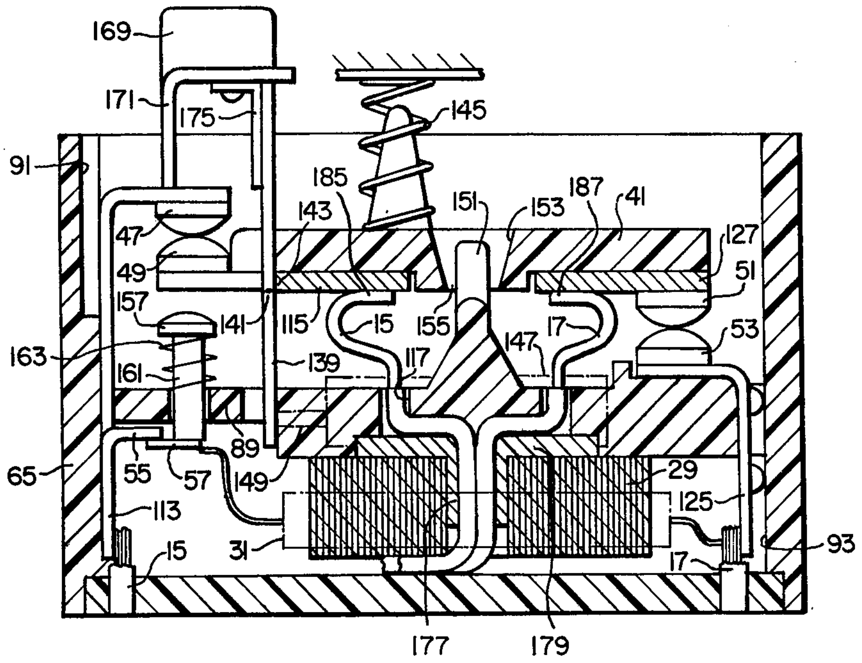
FIG. 6 is a vertical sectional view taken on the line VI—VI of FIG. 4 and showing the contact arm in the closed position.
Figure 7:
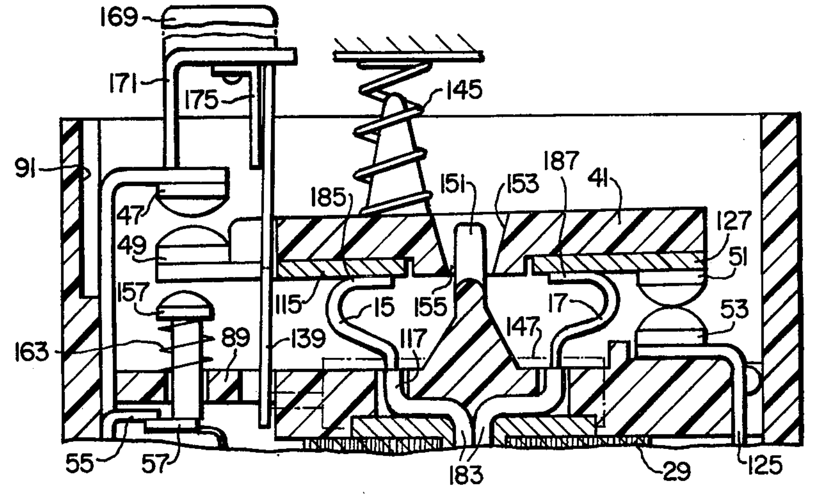
FIG. 7 is a fragmentary sectional view showing the contact arm in an intermediate position.

In accordance with this invention the contact arm 41 rotates about two different pivot points during the movement of the arm between the closed and open position as shown in FIGS. 6 and 7. A pivot point 151 extends through a hole 153 having tapered sides and having a lower side which provides a clearance 155 with the pivot point in the closed position of the arm 41. When the latch plate 139 is moved to the unlatched position (FIG. 7), the clearance 155 around the pivot point 151 prevents the arm from contacting the pivot point so that the spring 145 moves the plate counterclockwise initially around a pivot between the contacts 51, 53.

Figure 8:
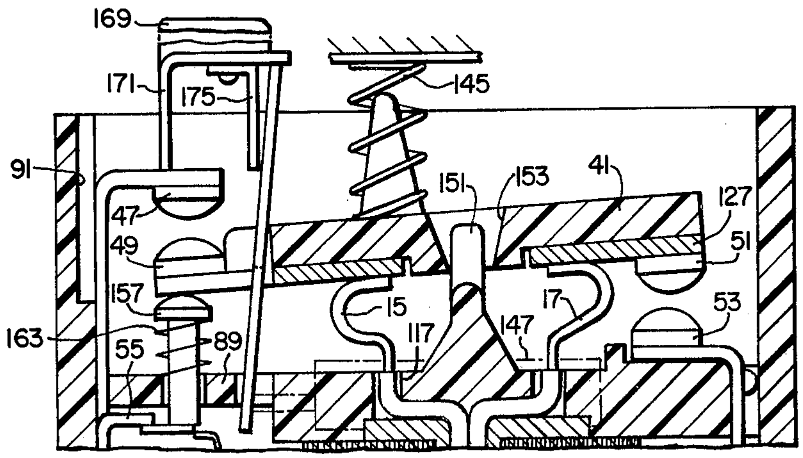
FIG. 8 is a view similar to FIG. 6 and showing the contact arm in the open position.

Moreover, in accordance with this invention, the contact plate 115 strikes a button 157 (FIG. 8) on a pin 161 and against a spring 163 so that the contact 57 is moved from the contact 55 which is a flange portion of the contact bracket 113. Likewise, in accordance with this invention the clearance 155 between the arm 41 and the pivot point 151 no longer exists so that continued movement of the arm now depends upon pivot about the pivot point 151, causing the contacts 51, 53 to separate as shown in FIG. 8. Thus, the several pairs of contacts open and close sequentially and not simultaneously.

The sequential operation of the contact arm 41 provides for maintenance of a circuit through the trip circuit 31 during opening and closing of the contacts. So long as the receptacle 11 is properly wired, the neutral line will close before the hot line closes, because of the typical relay design, and there will be no problem in case of continuing ground fault. However, in case of reverse polarity, due to inadvertent wiring of the receptacle, the neutral line becomes the hotine and will close before the neutral line closes which, without the third contact or contact means 55, 57, would not provide the protection against ground fault. Accordingly, the button 157 having a coil spring 163 to hold it in the upper position (FIG. 6) provides protection against ground fault in case of reverse polarity or miswiring of the receptacle, because it closes before both of the line and neutral contacts and energizes the trip circuit 31 as soon as the contacts 51, 53 close. In addition, in the open position the contacts 51, 53 have a smaller gap 165 (FIG. 8) than a gap 167 between contacts 47, 49. Moroever, the length of the control arm 41 between the pivot point 151 and the contact 51 is less than that between the pivot point 151 and the contact 49. Thus, when the arm 41 is moved to the closed position, the contacts 51, 53 close before the contacts 47. 49.

The arm 41 is moved to the closed position by a manual reset button 169 located on a bracket 171 that is slidably mounted in grooves (not shown) in the housing 65. The lower end of the bracket is spring biased upwardly by a coil spring 173 (FIG. 3). The latch plate 139 is pivotally mounted to move between the latched and unlatched positions (FIGS. 6 and 8) and is retained in place by an L-shaped flexible member 175, the upper end of which is secured to the bracket 171 and the lower end of which is secured, such as by a spot weld, to the latch plate 139. Thus, each time the solenoid plunger 149 is driven against the lower end of the latch plate 139, the plate rotates clockwise from the latched to the unlatched positions (FIGS. 6 and 8). When the reset button 169 is depressed against the spring 173, the latch plate moves down and the shoulder 141 moves below the edge 143 of the contact plate 115, whereby the latch plate rotates counterclockwise under influence of the flexible member 175. Upon release of the reset button 169 the sprng 173 raises the reset button assembly and the contact arm 41 to the closed position of FIG. 6.

During resetting of the contact arm 41 to the closed position the arm first rotates on the pivot point 151 at 177 (FIG. 8) until the contacts 51, 53 engage each other. Thereafter, the pivot point for the arm moves to the point of contact between the contacts 51, 53 until the contacts 47, 49 are closed. During the initial period of movement of the contact arm 41 to the closed position, the pin 161 is urged upwardly by the spring 163 until the contacts 55, 57 are closed, thereby closing the circuit through the trip circuit 31 which in turn continues to operate the solenoid 149 to prevent the arm 41 from remaining in a closed contact position until an existing ground fault is eliminated.

Moreover, in accordance with this invention as shown in FIGS. 5 and 6, the conductors 15, 17 extend across one side of the core 27, and through the central opening therein where the conductors are retained in place by suitable means to prevent any movement of the conductors within the core. Such suitable means may include an islet 177 (FIG. 6) having a flange 179. The islet is crimped tightly around the conductors 15, 17 and is seated within the opening of the core 29 with the flange 129 disposed against the partition 89. The flange 179 is preferably seated within an enlarged portion 181 of the aperture 117 to further limit any movement of the assembly by clamping the assembly in place between the core 29 and the partition 89. Between the islet 177 and the arm 41 the conductors 15, 17, having similar insulating sleeves 183, are connected to the contact plates 115, 127 at joints 185, 187, respectively. The segments of the conductors 15, 17 next adjacent the joints 185, 187 are of ample lengths and are preferably arcuate to minimize as much as possible any influence of the conductors may have on movement of the arm 41. Thus, the provision of more than enough length of the segments of the conductors 15, 17 adjacent the arm 41 permits the arm to move uninhibitedly in response to the downward pressure of the spring 145 when the latch plate 139 is actuated.

Figure 9:
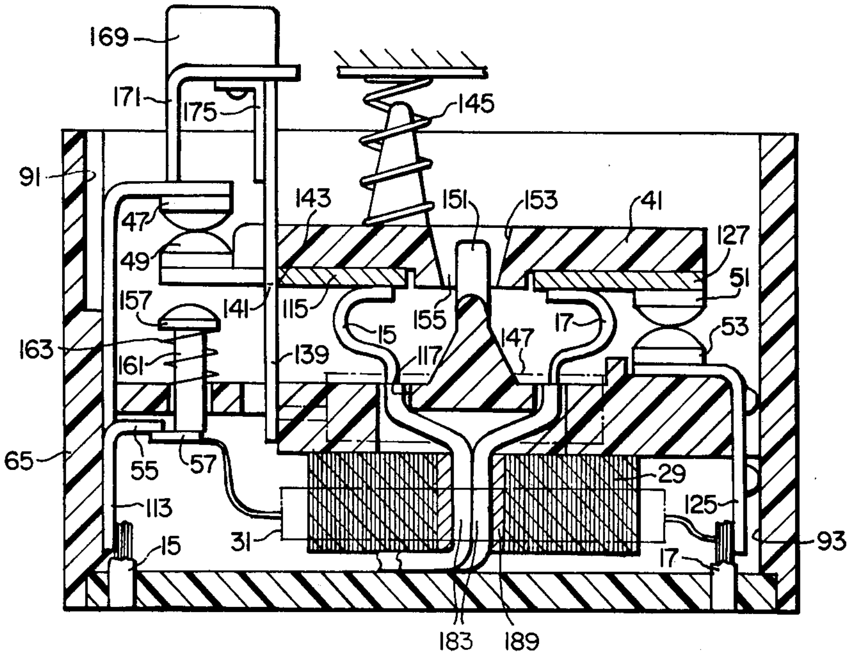
FIG. 9 is a fragmentary sectional view of another embodiment showing the manner in which the shunt wires are disposed.

Another embodiment of the invention is shown in FIG. 9 in which the insulated conductors 15, 17 extend through the hole in the core 29 where they are retained by suitable clamping means such as a segment 189 of heat shrink tubing which grips or clasps the conductors tightly together within the core. In addition the insulating sleeve 183 on the conductors 15, 17 are clamped between the core 29 and the partition 89, whereby the ample arcuate uninsulated portions of the conductors 15, 17 are free to move in response to movement of the arm 41.

Accordingly, the electric receptacle of this invention avoids many disadvantages of prior art receptacles and provides advantages that have not been available heretofore. Those advantages include a more compact receptacle unit which fits into a standard wall outlet box, line terminals secured in place and formed for maximum strain relief on the electrical contact gap, and a partition wall enabling the placement of each component in its intended location so that movement of the solenoid mechanism and the reset mechanism are avoided thereby providing greater reliability without the use of additional fasteners.

What is claimed is:

1. An electric receptacle for mounting in a wall outlet for connecting electrical appliances to the conductors of a power source, comprising an insulating housing adapted to fit in a wall outlet box, receptacle components and electronic components within the housing; the receptacle components comprising socket means for receiving the plug of an electrical appliance first and second pairs of contacts operable between open and closed positions for interruptably connecting the socket means to a power source, the stationary contacts of each pair of contacts being operatively mounted on the housing, a contact mounting arm carrying the movable contacts of each pair of contacts at spaced locations on the arm and aligned with the corresponding stationary contacts, a latch member releasably holding the contact arm in closed contact positions of said contacts, bias means for biasing the arm to a contact open position when the latch member is released and located between the movable contacts to effect pivotal movement of the arm upon the first pair of contacts during the initial pivotal movement when the latch member is released to effect opening of the second pair of contacts, a pivot point for the arm between the first pair of contacts and the bias means for final pivotal movement of the arm to effect opening of the first pair of contacts subsequent to opening of the second pair of contacts, operating means for moving the contacts to their open position in response to a fault signal; the electronic components comprising ground fault responsive means for monitoring the flow of current in the conductors and delivering a fault signal to the operating means in response to a current imbalance in the conductors, and said responsive means comprising a toroidal coil through which the conductors extend.

2. The electric receptacle of claim 1 in which the housing has opposite edge walls and opposite ene walls forming open front and rear sides, a partition within the housing and dividing the housing into first and second compartments the first compartment communicating with the open front side and the second compartment communicating with the open rear side, the partition having aperture means between the compartments, the partition having at least one portion nearer the front side than the remaining portions thereof, receptacle components in the first compartment, and electronic components in the second compartment.

3. The electric receptacle of claim 2 in which the partition comprises component-receiving pockets extending from one compartment into the other.

4. The electric receptacle of claim 2 in which the partition comprises recessed surfaces for supporting the components in each compartment.

5. The electric receptacle of claim 2 in which the segments of the conductors on one side of the core are twisted for at least one turn around each other and disposed adjacent to said side of the core.

6. The electric receptacle of claim 5 in which the segments of the conductors on the other side of the core extend to the contact arm and are flexibly disposed between the core and the contact arm.

* * * * *